United States Patent
Song et al.

(10) Patent No.: US 9,567,223 B2
(45) Date of Patent: Feb. 14, 2017

(54) METHOD FOR MANUFACTURING GRAPHENE FILM, GRAPHENE FILM MANUFACTURED BY SAME, ELECTRONIC DEVICE COMPRISING THE GRAPHENE FILM

(71) Applicant: KOREA INSTITUTE OF SCIENCE AND TECHNOLOGY, Seoul (KR)

(72) Inventors: Yong Won Song, Seoul (KR); Jae Hyun Park, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 14/456,550

(22) Filed: Aug. 11, 2014

(65) Prior Publication Data

US 2015/0098891 A1    Apr. 9, 2015

(30) Foreign Application Priority Data

Oct. 7, 2013  (KR) .................. 10-2013-0119337

(51) Int. Cl.
  *C01B 31/04* (2006.01)
  *C23C 16/46* (2006.01)
  *C23C 16/26* (2006.01)

(52) U.S. Cl.
  CPC ....... *C01B 31/0453* (2013.01); *C01B 31/0484* (2013.01)

(58) Field of Classification Search
  CPC ............ C01B 31/04; C23C 16/26; C23C 16/46
  USPC ........................................................ 423/448
  See application file for complete search history.

(56) References Cited

U.S. PATENT DOCUMENTS

2009/0047520 A1* 2/2009 Lee .................... B82Y 15/00
                                                         428/408

FOREIGN PATENT DOCUMENTS

| KR | 1020120108232 A | 10/2012 |
| KR | 1020120125149 A | 11/2012 |
| KR | 10-1287890 B1 | 7/2013 |
| KR | 1020130104071 A | 9/2013 |

OTHER PUBLICATIONS

Supplementary Information "Catalyst-free growth of readily detachable nanographene on alumina," Electronic Supplementary Material (ESI) for Journal of Materials Chemistry C accessed online at http://www.rsc.org/suppdata/tc/c3/c3tc31287a/c3tc31287a.pdf on Sep. 20, 2015.*

Jaehyun Park, et al; "Catalyst-free growth of readily detachable nanographene on alumina", Journals of Materials Chemistry C. vol. 1, pp. 6438-6445; First published online Aug. 12, 2013.

Xuesong Li, et al; "Graphene Films with Large Domain Size by a Two-Step Chemical Vapor Deposition Process", NanoLetters, vol. 10, pp. 4328-4334, Published on Web: Oct. 19, 2010.

Qingkai Yu, et al; "Control and characterization of individual grains and grain boundaries in graphene grown by chemical vapour deposition". Nature Materials, vol. 10, Jun. 2011; pp. 443-449.

* cited by examiner

Primary Examiner — Daniel C McCracken
(74) Attorney, Agent, or Firm — Ladas & Parry LLP

(57) ABSTRACT

A method for manufacturing graphene is provided, comprising (1) introducing a supporting substrate in a reactor; (2) preparing (nano) crystalline alumina catalyst having catalytic activity on the supporting substrate to prepare an insulating substrate; (3) growing nano graphenes on the insulating substrate to manufacture graphene film comprising graphene layer of the nano graphenes, which are grown without use of metal catalyst substantially. The graphene layer composed of the nano graphene has spatially homogeneous structural and electrical properties even in synthesis as large area and can be applied to flexible electronic devices.

In addition, as it has easy detachment of the substrate and the graphene film and can detach the graphene film without damage of the substrate, leaving no residual graphene on the substrate, it is possible to grow the nano graphene by reusing the substrate.

19 Claims, 14 Drawing Sheets

METHOD FOR MANUFACTURING
GRAPHENE FILM, GRAPHENE FILM
MANUFACTURED BY SAME, ELECTRONIC
DEVICE COMPRISING THE GRAPHENE
FILM

CROSS-REFERENCE TO RELATED APPLICATION

Pursuant to 35 U.S.C. §119(a), this application claims the benefit of earlier filing date and right of priority to Korean Application No. 10-2013-0119337, filed on Oct. 7, 2013, the contents of which is incorporated by reference herein in its entirety.

BACKGROUND OF THE INVENTION

1. Field of the Invention

The present invention relates to a method for manufacturing graphene film, a graphene film manufactured by the same, and electronic device comprising the graphene film, which manufacture a graphene film easily detached from a growth substrate with more simplified process and intends to apply its properties such as excellent spatial homogeneity to electronic devices.

2. Background of the Invention

Graphene, a material having useful properties such as very high carrier mobility and optical nonlinearity, is spotlighted as the most prominent material applicable to electronic/photo-electronic devices in future.

Up to date, a lot of studies on methods for preparing or applying various graphene to yield graphene—having improved properties in its nano structure and electrical characteristics such as crystallinity, carrier mobility, and crystal scalability—with high efficiency have been progressed. Especially, the studies have focused on application of graphene including graphene based transparent electrode, channel layer of activation device, battery electrode, femtosecond laser using graphene, and photo-detector and brought valuable results in spite of its short history. However in order to apply the graphene material to electronics and photonics in future, shape control and layer number control of graphene as well as resistance between graphene nano layers are remained as tasks to be overcome.

Besides although it is required to yield graphene with a quality higher than a certain level even in preparing it for applying it in engineering, it has a problem of lower yield and its solution rises as an important task to be solved for commercialization of the graphene material. Along with this, provision of a method to minimize harmful defects on nano structure of graphene and a concrete solution to difficulty in graphene detachment occurring when transferring the synthesized graphene to user defined substrate (a substrate for applying the graphene material) are also required.

Large area graphene embarks a new chapter in application of the graphene material due to its new electrical and structural properties. As methods for preparing this large area graphene, for example, graphitization on a SiC substrate, a method for synthesizing graphene on a nickel catalyst using molten carbon source through chemical vapor deposition (CVD) method and a method for synthesizing graphene on a copper (Cu) catalyst using carbon precursor through CVD method receive attention.

Among these, the CVD method using copper catalyst has been known able to prepare large area single layer graphene with the highest quality up to several $\mu m^2$ (Yu, Q. et 68-5 2013-10-07 al. Control and characterization of individual grains and grain boundaries in graphene grown by chemical vapor deposition. Nature Mater. 10, 443-449 (2011)).

Growth of graphene using SiC substrate is important from the point that it is possible to form graphene directly on an insulating substrate. However, it has technological limits including high price of the substrate and difficulty in control of homogeneity and layer number of graphene. On the contrary, the graphene synthesis on a copper film is a method receiving attention because it has merits including advantageous price as well as capability to form large area single layer graphene with relatively homogeneous properties. However, it also has demerits such as additional demand for catalyst (copper) removing process and long time required for graphene film transfer process. However as it is a method capable of transfer to various substrates including flexible material, the synthesis of graphene film on a copper substrate has received attention as the most promising graphene synthesis method.

However, it has several problems also, including that transfer of multilayer graphene is difficult; (2) the target substrate should be flat; and (3) there should be strong adhesion between the graphene and the substrate.

Accordingly, methods to apply polymer mediated transfer technique of graphene film have been improved continuously and dry type transfer technique to detach graphene film grown on copper substrate was introduced. In addition, there have been several efforts to improve properties of graphene film grown on the copper substrate by controlling the properties of copper substrate and controlling growth conditions such as growth temperature, gas supply ratio, and pressure. (Li, X. et al., Graphene films with large domain size by a two-step chemical vapor deposition process. Nano Lett. 10, 4328-4334 (2010))

SUMMARY OF THE INVENTION

An object of the present invention is to provide a method to grow high quality graphene film with spatially homogeneous properties, controlling its grain size through simplified process. The graphene film is synthesized in form of graphene layer including nano graphene on a high dielectric (high-k) insulating substrate and has some merits, including that it is easy to detach the graphene film from the insulating substrate and it is possible to reuse the insulating substrate after detachment of the graphene film.

A method for manufacturing graphene film according to an example of the present invention comprises: (1) introducing a supporting substrate in a reactor; (2) preparing (nano) crystalline alumina catalyst having catalytic activity on the supporting substrate to prepare an insulating substrate; (3) growing nano graphenes on the insulating substrate to manufacture graphene film including graphene layer comprising nano graphenes.

The growth of the nano graphene is accomplished by pyrolyzing carbon source included in a reactive gas and introduced into the reactor to grow the nano graphenes on the insulating substrate, wherein it is possible to control the grain size of the nano graphene as 5 nm-1000 μm and grow nano graphene having small and uniformly distributed sheet resistance. The method for manufacturing graphene film can control the grain size of the nano graphene by controlling growth time of the nano graphene in the step (3).

The alumina catalyst may be metastable and the layer of the alumina catalyst may comprise at least one selected from the group consisting of gamma alumina, delta alumina, and the combination thereof.

In the step (3), the nano graphenes may be grown by setting the growth time to no more than 120 mins and the growth temperature of the graphene film in the step (3) may be no more than 1350° C.

The carbon source of the step (3) may be at least one selected from the group consisting of methane, ethane, propane, acetylene, methanol, ethanol, propanol and the combinations thereof.

The reactive gas of the step (3) may include ambient gas. The ambient gas may be at least one selected from the group consisting of nitrogen, helium, neon, argon, hydrogen, and the combinations thereof.

The reactive gas may include $H_2O$ and the content of $H_2O$ may be no more than 20 ppm on the basis of total reactive gas.

The graphene layer may be composed of single layer or multilayer graphene and the adhesion energy between the layer of the alumina catalyst and the graphene layer may have smaller value than the adhesion energy between graphene layers in the multilayer graphene. The adhesion energy between the layer of the alumina catalyst and the graphene layer may be no more than 5 meV/carbon atom.

In the Raman spectrum of the graphene layer, 2D peak may be shifted to red and FWHM of the 2D peak may be 30-100 cm$^{-1}$.

The method for manufacturing the graphene film may not use a metal catalyst substantially in the step (2).

The precursor includes aluminum precursor and oxygen precursor.

The aluminum precursor may be at least one selected from the group consisting of trimethyl aluminium ((CH3)3Al, TMA), aluminum isoproxide ([Al(OC3H7)3], IPA), methyl-pyrolidine-tri-methyl aluminum (MPTMA), ethyl-pyridine-triethyl-aluminum (EPPTEA), ethyl-pyridine-dim-ethyl-aluminum hydridge (EPPDMAH), alane (AlCH$_3$) and the combinations thereof. The oxygen precursor may be at least one selected from the group consisting of $O_3$, $H_2O$ and the combinations thereof.

The step (2) may include crystalizing amorphous or noncrystalline alumina. The crystallization may be a process of heat treatment at 700° C.-1100° C. for 1-30 min.

The method for manufacturing graphene film may further include (4) detaching the graphene film from the insulating substrate after the step (3).

The step (4) may include forming a graphene-polymer complex by coating a polymer solution on the graphene layer and detaching the graphene film which includes the graphene-polymer film from the insulating substrate.

The step (4) may include manufacturing a graphene-polymer complex by bonding a cohesive polymer film and the graphene layer and detaching the graphene film which includes the graphene-polymer film from the insulating substrate.

In the step (4), the insulating film detached from the graphene film may be reused as the insulating substrate of the step (2).

The graphene layer may have no more than 3 kΩ/□ of sheet resistance. In addition, the graphene layer may have no more than 5% of deviation of sheet resistance.

A graphene film according to another example of the present invention comprises nano graphenes having 5 nm-1000 μm of grain size and includes a graphene layer having no more than 3 kΩ/□ of sheet resistance.

Sheet resistance distribution of the graphene layer may have no more than 5% of deviation.

The graphene layer may include nano graphenes having 0.7-0.9 of mean area and variance ratio.

In the Raman spectrum of the graphene layer, 2D peak may be shifted to red and FWHM of the 2D peak may be 30-100 cm$^{-1}$.

An electronic device according to another example of the present invention includes the graphene film mentioned above. The electronic device may include secondary battery and thin film transistor, but is not limited in these.

DETAILED DESCRIPTION OF THE INVENTION

Figure 1:
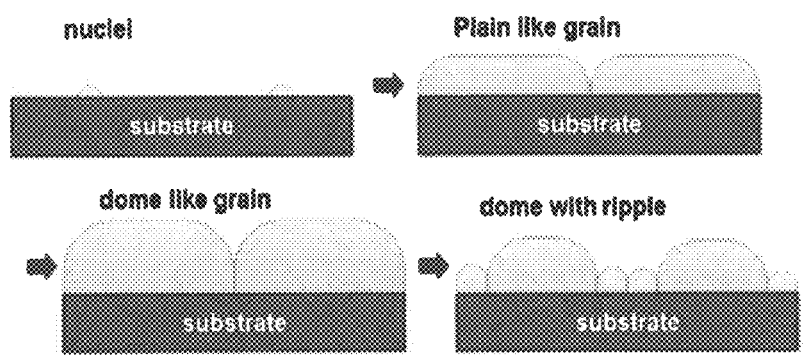
FIG. 1 is a conceptual drawing showing the process that nano graphene is grown and the graphene layer is formed in the method for manufacturing graphene film according to an example of the present invention.

A method for manufacturing graphene film according to an example of the present invention comprises: (1) introducing a supporting substrate in a reactor; (2) preparing (nano) crystalline alumina catalyst having catalytic activity on the supporting substrate to prepare an insulating substrate; (3) growing nano graphenes on the insulating substrate to manufacture graphene film including graphene layer comprising nano graphenes.

The method for manufacturing graphene film may also include (4) detaching the graphene film from the insulating substrate after the step (3).

The method for manufacturing graphene film can manufacture high quality graphene film by controlling grain size (diameter) of the nano graphene to 5 nm-1000 μm.

The grain size of the nano graphene can be controlled concretely by controlling time and temperature to grow the nano graphene in the step (2), changing amount of the carbon source, changing roughness of the substrate or crystal face of the exposed alumina catalyst, and changing addition of foreign matter (reactive gas) such as $H_2O$ and its amount. For example in case of controlling the grain size by the synthesis time, when optimizing the process condition using 850 sccm of $CH_4$ and 50 sccm of $H_2$ at 1050° C., it is possible to form graphene film with 20 nm of grain diameter in no more than 10 min of the process time, 20-60 nm of grain diameter in 10-15 min of the process time, and 60 nm-1000 μm of grain diameter in 15 min-2 hr of the process time.

The graphene layer may be composed of nano graphene grown and formed in state of sharing their grain boundaries in the step (3).

The step (1) means a process to prepare the supporting substrate in a reactor, the step (2) may comprise a process to synthesize graphene and crystalize the alumina catalyst on the supporting substrate in the reactor or a process to prepare (nano) crystalline alumina catalyst with catalytic activity by locating an alumina catalyst formed supporting substrate in the reactor in advance. The process to prepare (nano) crystalline alumina catalyst with catalytic activity by crystalizing the alumina may be accomplished separately from the process to grow graphene film in the step (3) and with serial heat treatment process.

The alumina catalyst may be metastable and have alumina with no more than 14 nm of the grain size.

The step (2) includes a process to crystalize amorphous or noncrystalline alumina and the crystallization may be accomplished by temperature condition by means of CVD growth or heat treatment. The heat treatment for crystallization of the alumina may be done at 700° C.-1100° C. of temperature range for 3-15 min, wherein it is possible to grow metastable alumina catalyst with enough small grain size and excellent catalytic activity for growth of graphene.

The precursor for growth of the alumina catalyst may include at least one aluminum precursor selected from the group consisting of trimethyl aluminium (($CH_3)_3Al$, TMA), aluminum isoproxide ([$Al(OC3H7)_3$], IPA), methyl-pyrolidine-tri-methyl aluminum (MPTMA), ethyl-pyridine-triethyl-aluminum (EPPTEA), ethyl-pyridine-dimethyl-aluminum hydridge (EPPDMAH), alane ($AlCH_3$) and the combinations thereof and at least one oxygen precursor selected from the group consisting of $O_3$, $H_2O$ and the combinations thereof.

In the step (2), the alumina may be grown and formed by using ALD (atomic layer deposition) at no more than 300° C. of growth temperature and use preformed alumina. In case of applying the preformed alumina or the above grown alumina, a process to treat amorphous or noncrystalline alumina to the (nano) crystalline alumina catalyst through crystallization is needed when the alumina is amorphous or noncrystalline. This crystallization process may be progressed by heat treatment at 700° C.-1100° C. for 1-30 min or by heat treatment for 3-15 min.

In the crystallization process, temperature rising rate from room temperature to the heat treatment temperature may be accomplished in the range of 6° C./min-140° C./min. In this process, it is possible to form (nano) crystalline alumina with catalytic activity for growth of graphene. In addition, it is possible to control surface roughness of the alumina catalyst in the growth and crystallization process of alumina and control growth rate of the graphene and density of the alumina thin film through this.

On the surface of insulating substrate in the step (2), it is possible to grow nano graphene without additional metal catalyst. The insulating substrate includes a metal oxide layer such as alumina on its surface and is featured by not having metal catalyst surface such as nickel and copper generally used for growth of graphene. Besides, the alumina catalyst formed on the insulating substrate may have a phase showing catalytic activity able to grow graphene with excellent properties and include at least one phase selected from the group consisting of kappa alumina, gamma alumina, delta alumina, and theta alumina. Preferably, the alumina catalyst may include kappa alumina or gamma alumina and be composed of at least one selected from kappa alumina, gamma alumina, and the combinations thereof. The alumina catalyst has $Al_{III}$ site (tri-coordinated Al site), so has excellent catalytic property and can play a role as a good catalyst in synthesis of nano graphene.

Preferably, the layer of the alumina catalyst may include gamma alumina on the surface and be composed of gamma alumina. When the alumina catalyst is composed of gamma alumina, the alumina catalyst itself is metastable and it is possible to lower temperature necessary for growth of nano graphene and form a graphene film with good quality having small and homogeneous nano graphene.

The alumina catalyst may be affected by growth rate of nano graphene and quality of the graphene layer according to its surface features. Concretely, big surface roughness of the alumina catalyst may accelerate growth speed of the nano graphene. On the contrary, small surface roughness of the alumina may reduce defects that may exist in the graphene film. Therefore, it is possible to control the surface roughness of the alumina reduced to prepare high quality graphene film.

The root mean square roughness (Rq) of the alumina catalyst may be no more than 2 nm or no more than 0.3 nm. In case of growing graphene film using the alumina catalyst having the surface roughness, it is possible to obtain high quality graphene film with smaller defects and homogeneous surface features. For example the root mean square roughness of the layer of the alumina catalyst may be no more than 0.27 nm or no more than 0.18 nm.

The alumina catalyst with a form of thin film play a role as a catalyst for growth of nano graphene as well as a role as a substrate on which the graphene layer is grown. The layer of the alumina catalyst is discriminated from traditional metals (for example, Ni and Cu) applied for growth of graphene at the point that it is crystalline aluminum oxide and also differentiated from the silica (SiO2) substrate playing a role as a supporting substrate traditionally.

The graphene grown on the alumina film playing a role as a catalyst has a merit that it is easy to detach it from the substrate after completion of its growth. When comparing it with the case applying the silica substrate as well as the case growing the graphene film by using a metal catalyst, detachment of graphene film grown on the aluminum catalyst is far easier. This means that it is possible to detach the graphene film, not leaving a part of it on the substrate and minimizing its damage. As mentioned above, the reason that the graphene film manufactured by the present invention can be detached more easily in comparison with traditional graphene film prepared on the metal substrate such as copper and nickel or the silica substrate is due to weak adhesion between the graphene and the alumina. Concretely, in case of detaching the graphene film and the growth substrate by coating polymer on the graphene film, it is possible to detach the graphene film and the growth substrate minimizing damage of the graphene film when adhesion between the graphene and the coated polymer is larger than the graphene and the growth substrate (alumina, SiO2, or Cu). However in general when synthesizing graphene film using growth substrate made of Cu and SiO2, there are some problems that it is impossible to make large difference of adhesion between the graphene and the coated polymer and adhesion between the graphene and the growth substrate and it is difficult to apply the graphene from deterioration of the graphene quality during its detachment process for applying it to devices. However, when using the alumina catalyst on the growth substrate, it is possible to solve these problems. When using the alumina catalyst, it is also possible to transfer bilayer type of graphene film to a device because the adhesion between the graphene and the growth substrate is smaller than that between the graphene and the graphene.

When comparing adhesion between the graphene-$SiO_2$ and adhesion between graphene-alumina experimentally, it was found that the latter had at least 30% of less adhesion energy than the former. In addition, when the graphene film manufactured by the present invention included a dome shaped nano graphene, it was found that it had at least 1/20 time of less adhesion energy in comparison with the adhesion between the graphene-$SiO_2$. This weak adhesion between the graphene—the alumina is weaker than adhesion between graphene-graphene included in multilayer graphene having at least two layers.

From this difference, the graphene film of the present invention has its unique nature different from the graphene film made by existing methods, which is easy detachment of the substrate and the graphene film.

Although traditional single layer or multilayer graphene films grown on metal or silica substrate had problems such as an own damage of the graphene film during detachment process or interlayer detachment of the graphene film, the graphene film manufactured by the present invention solved these problems. Thus, the graphene film manufactured by the present invention can minimize damage of graphene film in detachment process between the graphene—the substrate and be detached from the substrate with only single transfer (or detachment) process. Especially when applying gamma alumina as a catalyst, it is possible to manufacture a graphene film with good quality as well as detachment easiness.

The step (3) is a process to grow nano graphene on the insulating substrate by introducing and pyrolyzing "reactive gas including carbon source". The growth of nano graphene may be accomplished by thermal chemical vapor deposition. The carbon source may be anything able to grow the graphene on the substrate with the thermal chemical vapor deposition and preferably, at least one selected from the group consisting of methane, ethane, propane, acetylene, methanol, ethanol, propanol, and the combinations thereof.

The reactive gas may include ambient gas with the carbon source and the ambient gas is an inert gas. The inert gas may be at least one selected from the group consisting of nitrogen, helium, neon, argon, hydrogen, and the combinations thereof.

In the existing growth process of graphene using metal catalyst, hydrogen was included in the ambient gas and applied. This is to apply a reducing atmosphere using hydrogen for the purpose to reduce a small amount of metal oxide that exists on the surface of metal catalyst and may give negative effects to synthesis of graphene. Besides, because the present invention uses alumina catalyst, an oxide, as a catalyst for growth of the graphene film, it is not required to progress the reaction in the reducing atmosphere necessarily.

The ambient gas may be preferably argon (Ar), which can grow graphene film with less defects and better quality.

The reactive gas may also include $H_2O$. The small amount of $H_2O$ included in the reactive gas can play a role as a promoter for the growth of nano graphene to improve quality of the grown graphene layer. Content of the $H_2O$ may be no more than 20 ppm on the basis of total reactive gas, which can exert its sufficient function as a promoter.

In the step (3), growth temperature of the graphene film (target temperature) may be no more than 1350° C., may be no more than 1050° C., may be 100-800° C. and may be 450-800° C.

Because the preparation of the graphene film is accomplished by a process to grow the nano graphene on the insulating substrate by pyrolyzing carbon source introduced into the reactor, the growth temperature of the graphene may be affected by the type of carbon source.

For example, in case of synthesizing graphene film using methane used as carbon source under the catalyst, relatively high temperature treatment is required, because treatment in temperature range with good catalytic activity is needed to synthesize graphene film with good quality by using methane, the most stable type of carbon source. Considering efficiency of process and application range of supporting substrate for the catalyst, however, it is preferable to perform synthesis of the graphene film in lower temperature range and the method for manufacturing graphene film in the present invention can obtain graphene layer with good quality preferably by applying 600-1050° C. of target temperature and more preferably by applying 600-800° C. of lower temperature.

Besides in case of applying ethane or alcohols, less stable carbon source than methane, it is possible to grow nano graphene by heat treatment at lower temperature.

In the step (3), the nano graphene may be grown with no more than 120 min of growth time. The growth time means time at target temperature excluding heating and cooling time toward the target temperature.

The growth time may be controlled according to synthesis conditions (type of carbon source, temperature, property of aluminum catalyst, and target quality of graphene film) and when fast synthesis is desired, it is possible to perform synthesis of graphene film within 3 min. However, when intending to acquire graphene film with high quality, it is possible to use alumina catalyst with smaller surface roughness and in this case and it is possible also to prepare graphene film by applying 10-120 min of growth time. For example when using alumina catalyst with no more than 0.3 nm of root mean square roughness, it is possible to identify graphene features from the deposit with more than 10 min of growth time and synthesize close packing type of graphene film with more than about 15 min of growth time.

The growth time of graphene film is done within significantly shorter time in comparison with the existing growth methods. By controlling the growth time, it is possible to control grain size of the nano graphene. For example, with 15 min of the growth time, it is possible to acquire graphene film with about 30 nm of grain size measured on the basis of grain boundary of the nano graphene and with 20 min of the growth time in the same condition, it is possible to acquire graphene film with about 60 nm of grain size. Namely although the growth time of graphene film can be controlled according to intended grain size of nano graphene, no more than 30 min is preferable and there is a merit to shorten the time required for preparing the graphene film, because it prepares the graphene film by growing the graphene within significantly shorter time in comparison with the traditional methods.

In the step (3), heating toward target temperature for growth of the graphene film may be done with 6° C./min-140° C./min of heating rate, preferably with at least 70° C./min of heating rate.

For the nano graphene included in the graphene layer, its grain size can be controlled by growth time of the graphene layer and it is possible to manufacture small grain sized and plane structured graphene layer or large grain sized and dome shaped graphene layer as necessary.

The growth of nano graphene is accomplished by including a process to growth nano graphene on the insulating substrate by pyrolyzing carbon source included in the reactive gas and introduced into the reactor, area distribution of the nano graphene may have Gaussian distribution and mean area and distribution ratio of grain of the nano graphene may be 0.7-0.9.

Gaussian distribution, f(x)

$$f(x) = \frac{1}{\sigma\sqrt{2\pi}} e^{-\frac{(x-\mu)^2}{2\sigma^2}}$$

μ: mean, σ2: variance

The mean area of the nano graphene may be no more than 3000 $nm^2$.

For example, when growing the nano graphene according to a method to be described below for 15 min, mean area of the grain may be 622 $nm^2$ and variance may be 501 $nm^2$ (FWHM: 590) and when growing it for 20 min, the mean area may be 1838 $nm^2$ and the variance may be 1500 $nm^2$ (FWHM: 1766). At this time, ratio of the mean area and variance of the grain is constant, as about 0.8.

This ratio of mean area and variance of the grain shows that the grown graphene film has substantially homogeneous features on the whole surface, which means that the graphene not only has high quality but also be advantageous for industrial application. The graphene film may include monolayer graphene comprising a single layer of graphene and include multiple layered (multilayer) graphene composed by stacking at least two layers of graphene.

The method for manufacturing graphene film may also include (4) detaching the graphene film from the insulating substrate to detach or transfer it after the step (3).

The step (4) may be done by a simple physical process to hold and detach a part of one end of the graphene film grown by the step (3). However, in order to detach the graphene layer without damage, the step (4) may preferably comprise a process to prepare it in form of graphene-polymer film and then detach it from the insulating substrate. The detach process may be accomplished simply by holding and peeling off a part of the graphene-polymer film.

Concretely, the step (4) may be done by a process to form a polymer film by spreading polymer solution on the graphene layer, drying the solution and then detaching the graphene-polymer film. For the spreading of polymer solution, any common coating method can be applied, any method able to perform coating of the polymer solution with desirable thickness without any damage of the graphene layer, and preferably spin coating method may be used.

The step (4) may include a process to prepare a graphene-polymer film by a process to bond a cohesive polymer film and the graphene layer and then detach the graphene-polymer film from the insulating substrate.

As the polymer, polymers including benzene ring, polysulfonates, polymers including carboxylic group, polymers including amide group, and polymers including amine group may be applied. For example, PVP(poly vinyl phenol), PI(polyimid), PET(polyethylene terephthalate), and PDMS (polydimethylsiloxane) may be used and using PVP(poly vinyl phenol), it may be easier to use PI(polyimid), and PET(polyethylene terephthalate) to detach the graphene film completely. In addition, the case detaching it with PVP(poly vinyl phenol) or PI(polyimid) has an excellent effect at the point that it is possible to transfer the graphene film more completely and preferably, PVP(poly vinyl phenol) may be applied for detachment of the graphene film, which may improve electrical conductivity of the detached graphene film.

The graphene-polymer film detached through the process may be flexible and used for a stretchable electronic device by using a substrate patterning method. The insulating substrate passed through the step (4) can be detached from the graphene film due to weak adhesion between the graphene layer and the insulating substrate and is reusable as the insulating substrate for the step (2).

This property is far more useful in case that the graphene layer is composed of a bilayer or a multilayer. The traditional monolayer or multilayer graphene which has been synthesized until now is featured by having stronger adhesion with catalyst surface (metals such as Cu and Ni, or silica) than adhesion between the graphene layers, so had a problem including interlayer detachment between the graphene layers of the multilayer graphene or damage of the graphene film during the detachment process of the substrate catalyst surface and the graphene film. Accordingly, it has been recognized as a problem difficult to solve to detach or transfer the graphene film without this damage.

However the graphene film prepared by the present invention can minimize damage of the formed graphene film and detach a part or whole of the graphene film without complex process such as etching, as the adhesion between the insulating substrate and the graphene film grown on the insulating substrate is weaker than that of traditional cases and particularly weaker than interlayer adhesion of the multi-layer graphene. This also has a merit able to simply further the whole process to prepare and apply the graphene film in comparison with traditional methods requiring separate process for detachment of the graphene layer.

Concretely, adhesion energy between the graphene layer and one side of the insulating substrate in contact with it may be no more than 2.6 meV/carbon atom and when the graphene film has a graphene dome shape to be mentioned below, its value may be no more than 1 meV/carbon atom.

The graphene film has a feature that gran size distribution of the nano graphene composing the graphene layer is small as well as easy detachment (transfer) from the substrate. Concretely, the nano graphene may have 0.7-0.9 of mean area and variance ratio of grain and the area distribution of the grain may have Gaussian distribution. For example, mean length of nano graphene grain in a sample grown for 15 min is 30 nm, of which 80% exists within +/−10 nm of the mean size and the mean length of nano graphene grain in a sample grown for 15 min is 60 nm, of which about 53% exists within +/−10 nm of the mean size.

In other words, the method for manufacturing graphene film of the present invention is featured by having relatively small grain size distribution of the graphene generally regardless of the grain size as well as being able to control the grain size of the graphene by controlling the growth time to grow the graphene film, which means that the grain size of the nano graphene is relatively uniform. The graphene layer having this grain size distribution has an excellent feature that the graphene layer can have homogeneous electrical property generally.

In particular, the nano graphene composing the graphene layer may have a certain size distribution regardless of the grain size and even though preparing it as a large area, the graphene film can have homogeneous electrical property generally. In a polycrystalline graphene film, size or area of the nano graphene can be controlled according to dimension of device for application and it is important to acquire a graphene film which is enough small and generally homogeneous to apply it to an intended device. For example, when applying the graphene film as a channel of a thin film transistor (TFT) device, it is possible to extend the channel length up to 120 nm, which cannot be achieved by a graphene film synthesized with traditional methods.

In the present invention, spatial nonhomogeneity held by the existing graphene film resulted from its polycrystalline property was solved by growing the grain size distribution of the nano graphene almost uniformly and it was identified experimentally that the graphene layer had spatially homogeneous electrical property. This prepared graphene layer is also characterized by very small deviation of sheet resistance spatially, which is a character necessary for applying the graphene layer to electronic devices industrially. Namely, the graphene film of the present invention may include graphene layer that can control the grain size of the nano graphene and is featured by spatial uniformity.

FIG. 1 is a conceptual drawing showing the process that nano graphene is grown and the graphene film is formed in the method for manufacturing graphene film according to an example of the present invention. As shown in the FIG. 1, for the graphene film, the carbon generated by pyrolysis of the carbon source forms a hemisphere shaped core on the substrate (step A) and the core grows along with the surface of substrate to grow a plane shaped nano graphene (step B). In this process, the nano graphene contacts with other nano graphene and a graphene layer covered with nano graphene densely by flat growth is formed on the surface. When stopping the growth of graphene in this step, it is possible to form a film including plane graphene layer where the nano graphene shares its boundaries each other.

Meanwhile when continuing the growth of graphene in the step B, plane growth of the graphene reaches the limit and the nano graphene forms a shape of up-convex grain, accumulating strong strain energy. This phenomenon can occur more easily when adhesion of the substrate and the graphene is low and it is more advantageous to use gamma alumina rather than alpha alumina as the catalyst to form a dome shaped structure because while the lattice of alpha alumina and the lattice mismatch of graphene are very small, the lattice of gamma alumina and the lattice mismatch of graphene is larger. Consequently, a dome shape where the central part of nano graphene is detached from the insulating substrate is formed and it is possible to form a graphene layer with a form that a part of nano graphene including the part composing the grain boundary (step C). Namely, a graphene film grown to the step C is composed of a dome shaped nano graphene that total or a part of nano graphene includes an up-convex structure in the grain and the graphene film may be made by sharing boundaries of the dome shaped nano graphene. And for this graphene film including the dome shaped nano graphene, its detachment may be easier due to significantly weakened adhesive strength between the insulating substrate and the graphene layer. When continuing the growth of nano graphene in the step C, a riffle may be formed between the dome shaped nano graphene (step D).

Figure 2:
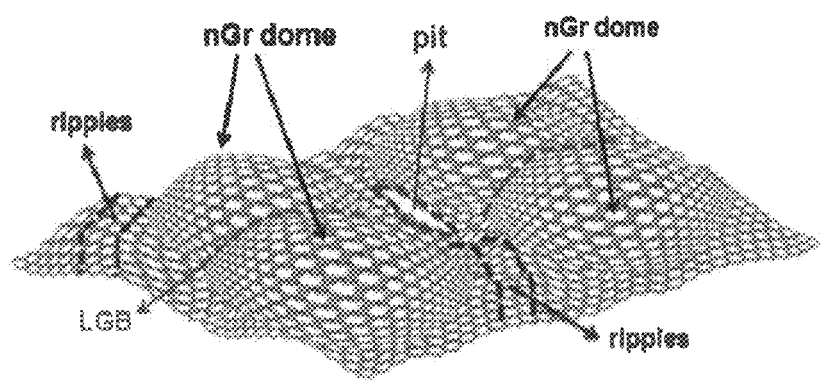
FIG. 2 is a conceptual drawing showing surface structure of the graphene film according to an example of the present invention.

When explaining surface structure of the graphene film acquired by continuing the growth until step D referencing FIG. 2 which is a conceptual drawing showing surface structure of the graphene film according to an example of the present invention, the nano graphene may include up-convex structure and node-like sub dome shaped structure in the grain and the graphene film may include a dome shape structure and a ripple structure, including the nano graphene sharing the boundaries each other.

Figure 3:
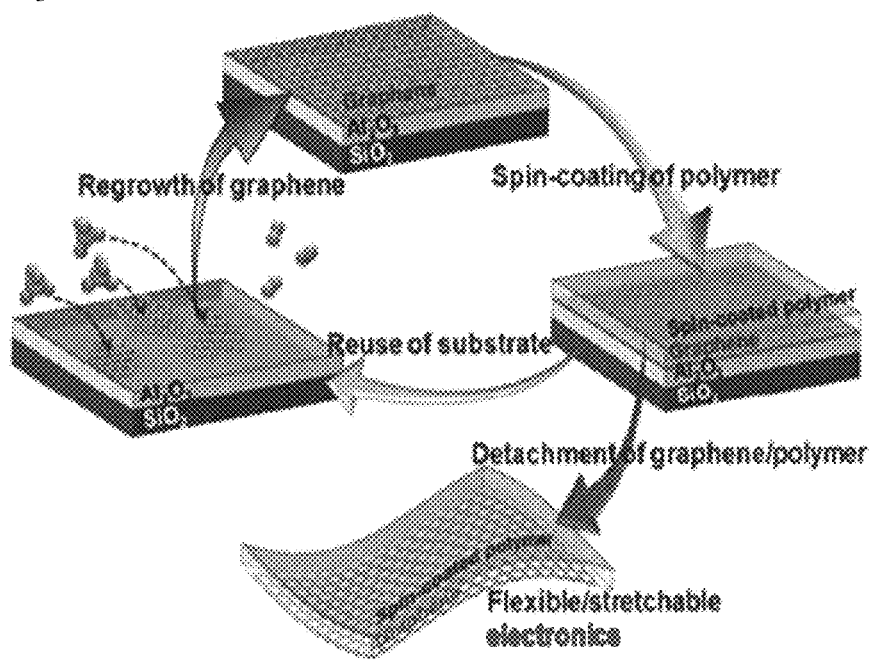
FIG. 3 is a conceptual drawing describing the process to prepare the graphene film according to an example of the present invention.

FIG. 3 is a conceptual drawing describing the process to prepare the graphene film according to an example of the present invention. As shown in the FIG. 3, the graphene film can be prepared by processes to grow nano graphene on the layer of the alumina catalyst formed substrate, form a graphene layer by the grown nano graphene, form a polymer layer on the graphene layer, and detach the graphene-polymer layer from the substrate.

The substrate can be detached clearly from the graphene film without damage of the alumina catalyst formed on the substrate and residual graphene layer. Thus it is possible to omit the process to form layer of the alumina catalyst additionally and reuse it as a substrate for growth of graphene and this reuse of the alumina formed substrate can be repeated at least 5 times. This can simplify further the manufacturing process of the graphene film in repetitive manufacturing process and allow mass production of high quality graphene.

When using the method for manufacturing the graphene film of the present invention, it is possible to manufacture the graphene film comprising nano graphene by growing nano graphene on the insulating substrate and particularly it is possible to grow the graphene film on the insulating substrate without use of separate metal catalyst by using the alumina film layer as a catalyst.

In addition, it is possible to provide large area graphene having spatially homogeneous electrical properties in general. The graphene layer may have no more than 600Ω/□ of sheet resistance, or 1 MΩ/□-600Ω/□ of sheet resistance. For example, it is possible to manufacture graphene film with 15 mm×15 mm of dimension, no more than 3 kΩ/□ of sheet resistance, and no more than 2.3% of standard deviation. Moreover, it is possible to prepare graphene film with no more than 2 kΩ/□ of sheet resistance and no more than 1% of standard deviation. When the sheet resistance of the graphene layer is lower, it is possible to provide better electric conductivity and obtain better performance in application to electric devices.

The graphene layer is featured by very small sheet resistance deviation. Concretely, the graphene film of the present invention may have no more than 5% of sheet resistance deviation, preferably no more than 3%, and more preferably no more than 2.3%. This small deviation of sheet resistance means homogeneous synthesis of electrical properties on the whole of graphene film and means also that the film has excellent quality generally in spite of large area. The sheet resistance deviation is calculated by $(R_s - R_{s,mean})/R_{s,mean} \times 100$, wherein the $R_s$ is sheet resistance, $R_{s,mean}$ is mean value of $R_s$.

For Raman spectrum of the graphene layer, its 2D peak may be shifted to red at least 20 cm$^{-1}$ on the basis of 2700 cm$^{-1}$ and the red shift 2D peak may have 30-100 cm$^{-1}$ of value. The graphene layer with this feature means that the nano graphene in the graphene layer is strained and in this case, the graphene film has band gap opening, so for the graphene to have semiconductor properties.

By the method for manufacturing the graphene film, an example of the present invention, it is possible to provide the graphene film including graphene layer having electrical property and provide large area graphene film able to control the grain size.

The graphene film according to another example of the present invention may have 0.7-0.9 of the mean area and variance ratio of nano graphene grain included in the graphene film. Grain area distribution of the nano graphene may have Gaussian distribution and have relatively narrow area distribution.

For example, when growing the nano graphene according to a method to be described below for 15 min, mean area of the grain may be 622 nm$^2$ and variation may be 501 nm$^2$ (FWHM: 590) and when growing it for 20 min, the mean area may be 1838 nm$^2$ and the variance may be 1500 nm$^2$ (FWHM: 1766). At this time, ratio of the mean area and variance of the grain is constant, as about 0.8.

Description on area distribution of the grain and its effects, sheet resistance of the graphene area and its distribution variance, and characteristics of its Raman spectrum 2D peak is overlapped with description in the method for manufacturing the graphene film, an example of the present invention, so omitted.

An electronic device according to another example of the present invention includes the graphene film mentioned above. The electronic device may be TFT, gas sensor, bio sensor, and flexible/stretchable device. Description on the graphene film is omitted.

Effects of Invention

The method for manufacturing graphene film, the graphene film, and an electronic device including it of present invention provides a graphene film having graphene layer having spatially homogeneous structural and electrical property. This graphene film is easily detachable from the substrate different from the existing graphene film and has spatially homogeneous property even in large area formation, so is advantageous to apply it to electronic devices. Furthermore, the nonmetal insulating substrate playing a role as a catalyst, can be reused as a substrate for growth of nano graphene after detachment of the graphene film.

EXAMPLE

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

Example 1

Preparation of Graphene Film

1. Preparation of Al$_2$O$_3$ Film Using ALD Method

Figure 22:
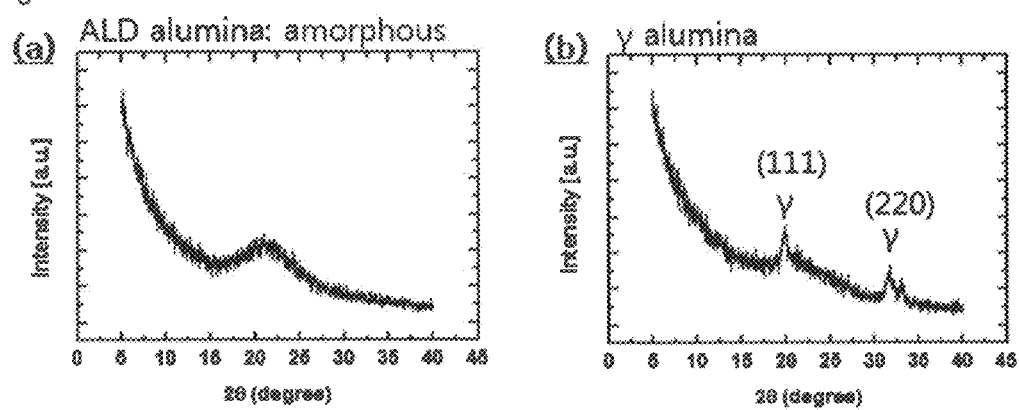
FIG. 22 shows XRD analysis results of alumina immediately after growth to ALD (a) and after separating the graphene film (b) in the example 1.

Using an ALD (atomic layer deposition) reactor (CN1 Co., LTD, Atomic Class), Al$_2$O$_3$ film grown thermally on a supporting substrate at 225° C. was prepared. As the supporting substrate, SiO2/Si with 300 nm of thickness was used, trimethylalumium (TMA) and DI water were used as precursors, and into the ADL reactor, 1 torr of basic pressure and 1 sec of pulse continuance time were applied and high purity nitrogen (99.999%) was supplied in 200 sccm for 60 sec. In the above condition, Al$_2$O$_3$ film with 50 nm of thickness was prepared by performing 500 cycles. Properties of the alumina immediately after vapor deposition were analyzed with XRD and shown in the FIG. 2 (1). As shown in the XRD analysis results, it was identified that the alumina immediately after vapor deposition has an amorphous feature. However, XRD analysis results of alumina catalyst which was crystalized as alumina having (nano) crystallinity in heating process between heat treatments for growth of nano graphene to be mentioned below and then measured after growth and detachment of graphene film were shown in FIG. 22 (b). It was identified that crystalline character of gamma alumina was shown. These are results showing that the vapor deposited alumina was transformed to the form of gamma alumina with catalytic activity. It was found that crystalline size of the (nano) crystalized alumina through the crystallization process (heat treatment process) was about 14 nm (calculated by Scherrer equation based on XRD data).

2. Growth of Nano Graphene and Preparation of Graphene Film

Nano graphene was grown on the gamma-Al$_2$O$_3$ film to form a film, using high purity CH$_4$ (99.999%) as carbon source without application of metal catalyst. After locating the above prepared Al$_2$O$_3$ film on a reaction furnace and performing flushing process by making 500 sccm of Ar flown into quartz tube for 10 min, heat the inside of reaction furnace to 1050° C., by heating it for 20 min under Ar atmosphere at 25° C.

After the temperature of reaction furnace reached 1050° C., nano graphene was grown on the Al$_2$O$_3$ film, supplying H$_2$ (25 sccm) and CH$_4$ (400 sccm) for a certain growth time and maintaining 1050° C. After the nano graphene was grown to form graphene layer, the reaction furnace was cooled, maintaining the supply of $H_2$ and $CH_4$ and the graphene film of the example 1 was prepared.

The graphene film was preparing, controlling the time to grow the nano graphene (growth time) to 5-40 min and for samples in 5, 10, 15, 20, 30 and 40 min, Raman spectrum was measured. Especially, surface characteristics of samples were observed, setting samples controlling the growth time to 15, 16 and 20 min respectively to sample 1, 2 and 3.

3. Detachment of Graphene Film and Insulating Substrate

As the graphene film prepared by the above method had weak adhesion between the $Al_2O_3$ film and the graphene layer, great care was given for its detachment and washing process. Especially, as direct spray of the solution for detachment or washing may cause partial detachment or distortion of the graphene layer, it required attention and it was desirable to insert the graphene film grown substrate into the solution.

Example 2

Characterization of Graphene Film Sample of the Example 1

1. Characterization with AFM (Atomic Force Microscope)

Figure 4:
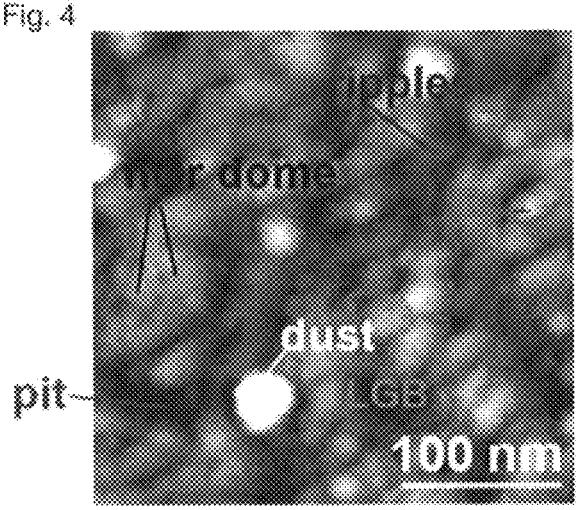
FIG. 4 is a result of AFM image observing surface of sample 1 of the example 1.
Figure 5:
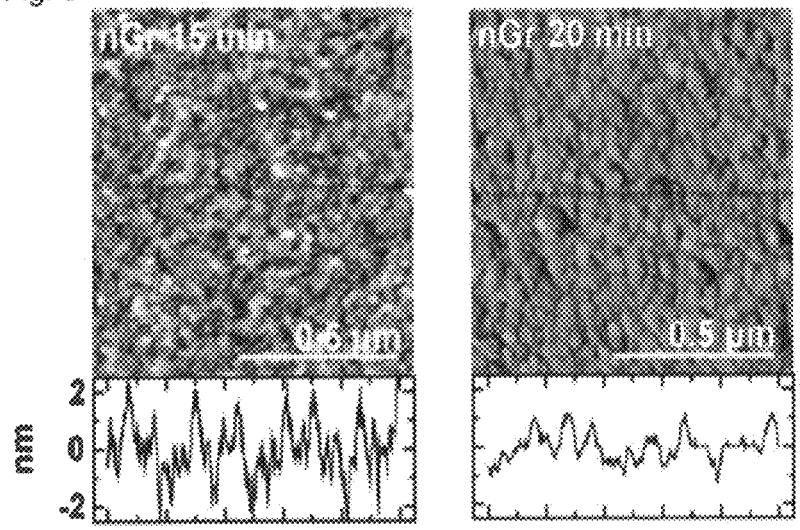
FIG. 5 is a result of AFM image observing surface of sample 1 and sample 3 of the example 3.
Figure 6:
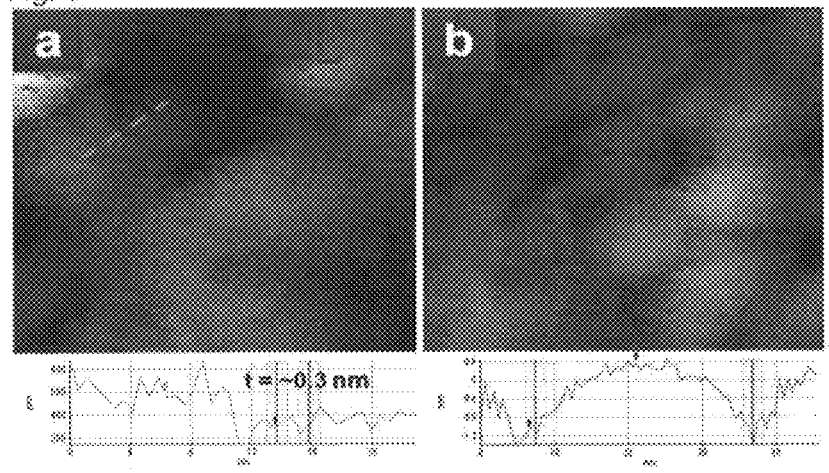
FIG. 6 is a graph showing an image partially magnifying the image of FIG. 4 and its line profile.

Observe the graphene layer surface of the sample 1 and sample 3 of the example 1 with AFM. Image of the sample 1 was shown in FIG. 4 with explanation about the structure and images of the sample 1 and sample 3 were shown in FIG. 5. As shown in the FIG. 4, it was found that the sample 1 of the example 1 had a structure where a dome and a ripple was formed and some fits and dusts were observed. As shown in the FIG. 5, it was identified that the graphene layer of the sample 1 and sample 3 of the example 1 was composed of nano grain grown as a form of covering the whole surface of substrate and the graphene film was formed well. In addition as shown in FIG. 6 showing partially magnified image of the sample 1 and its line profile, it was identified that especially in the right image marked as b, a dome shaped structure formed by nano graphene was established well.

Figure 7:
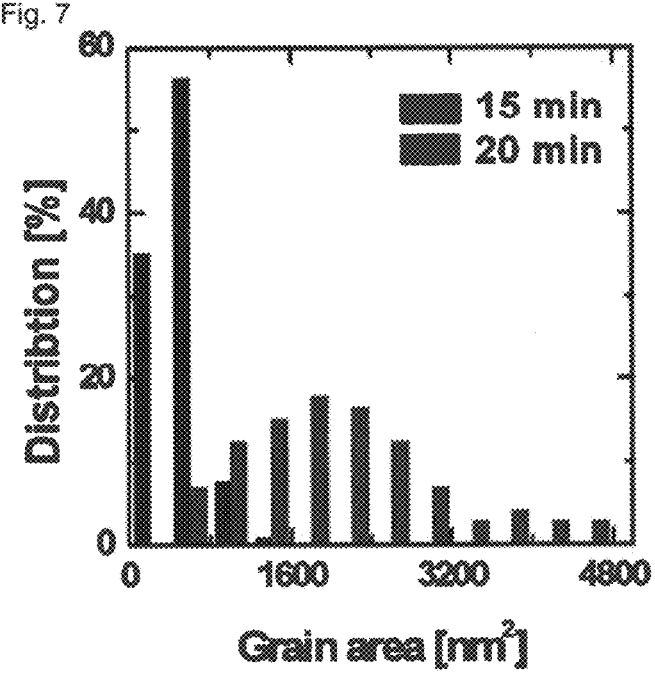
FIG. 7 is a graph showing grain size distribution of nano graphene composing the sample 1 and the sample 3, graphene films manufactured by the example 1.

FIG. 7 is a graph showing grain size distribution of nano graphene composing the graphene layer of the sample 1 and the sample 3, manufactured by the example 1. As shown in the FIG. 7, it was identified that the grain size of the sample 1 and the sample 2 was formed in a narrow distribution and mean area of each nano graphene was 550 and 2127 $nm^2$ respectively.

Figure 8:
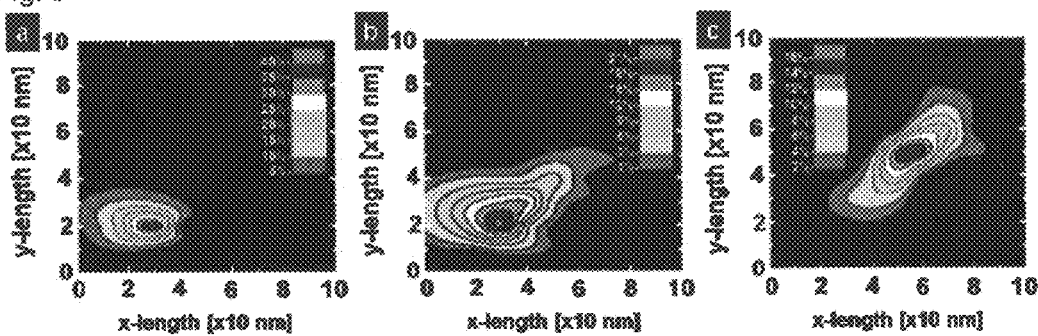
FIG. 8 (a)-(c) shows 2D contour plots of nano graphene grain size distribution of graphene film of sample 1-3 manufactured by the example 1.

FIG. 8 shows grain size distribution of nano graphene composing the graphene layer of the sample 1 and the sample 3, manufactured by the example 1. In the FIG. 8, the grain size distribution was shown with 2D contour plots and the sample 1-3 were marked as a-c respectively. As shown in the FIG. 8, it was found that the graphene film composing each sample was anisotropic oval shape and grown to more circular shape with longer growth time.

2. Assessment by Raman Spectrum

Figure 9:
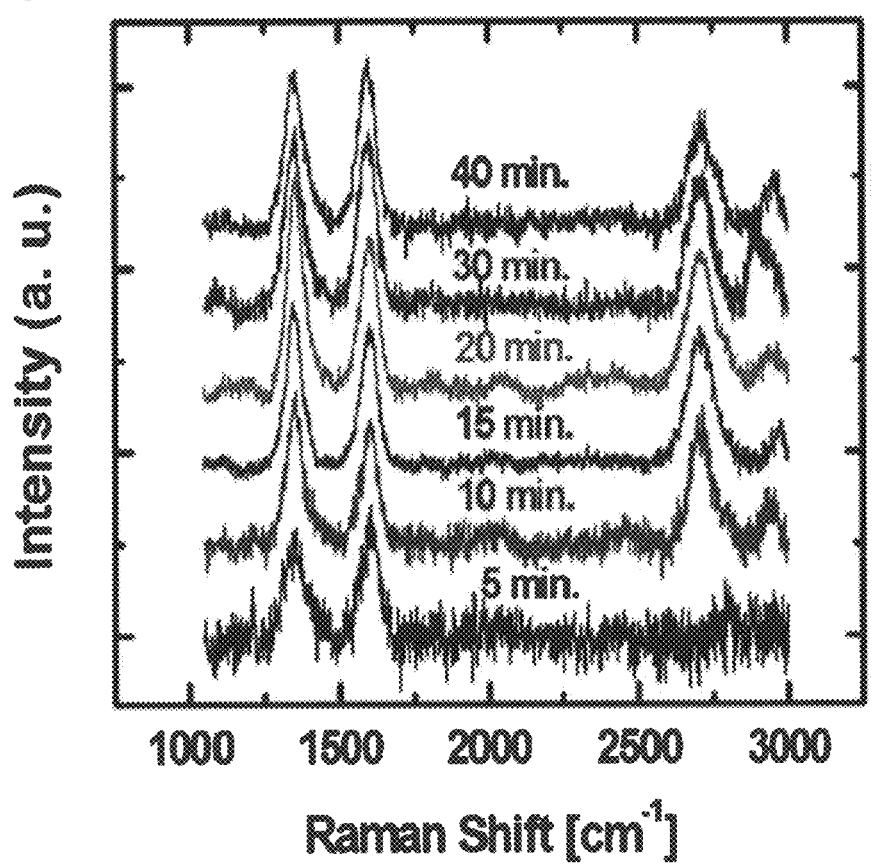
FIG. 9 shows results of Raman spectrum of samples manufactured with different growth time for the graphene film of the example 1.

Results obtained by measuring Raman spectrum of the sample manufactured with different growth time were shown in FIG. 9. As shown in the FIG. 9, it was identified that among the graphene layers manufactured by controlling the growth time from 5 min to 40 min, as the samples with 10-40 min of growth time showed clean D (about 1352 $cm^{-1}$), G peak (about 1600 $cm^{-1}$), and 2D peak (about 2707 $cm^{-1}$), the graphene film including graphene layer composed of sp2 graphitic bonds was well formed.

3. Assessment of Sheet Resistance and Spatial Homogeneity

Figure 10:
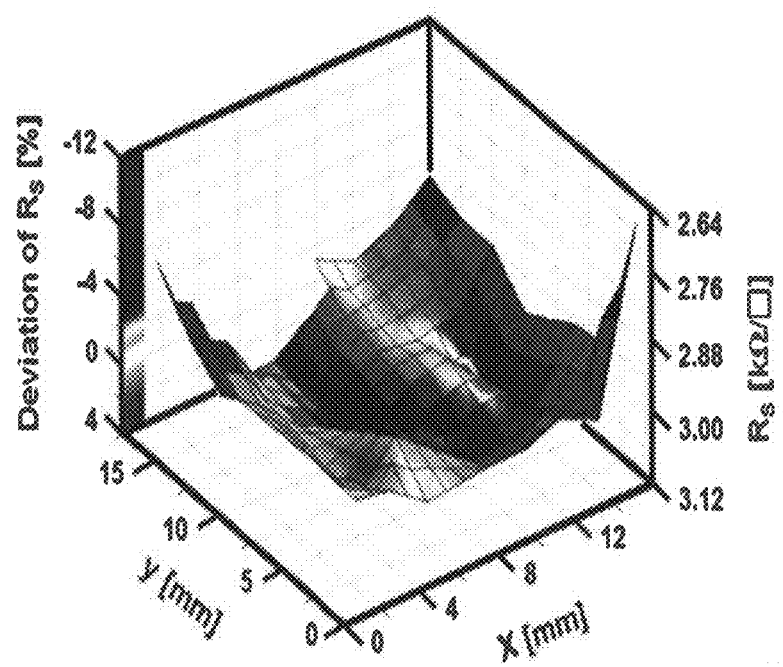
FIG. 10 is a graph showing distribution of sheet resistance (Rs) of the sample 1 of the example 1 and its deviation (%).

Distribution of sheet resistance (Rs) of the sample 1 of the example 1 and its deviation (%) was shown in FIG. 10. In the FIG. 10, Rs is sheet resistance and the sheet resistance deviation is calculated by $(R_s-R_{s,mean})/R_{s,mean} \times 100$, wherein (x, y) means location of nano graphene channel. As shown in the results of FIG. 10, it was found that Rs, mean and its standard deviation were no more than 3.0 kΩ/□ and no more than 2.3%, respectively. It was identified in the results that a graphene layer with significantly spatially homogeneous surface resistance feature was prepared.

Example 3

Characterization of Graphene Film Prepared by Reusing of the Film

1. Preparation of Graphene Film by Reusing of the Film

By reusing the $Al_2O_3$ film formed insulating substrate after detaching the graphene film formed on the $Al_2O_3$ film of the insulating substrate in the example 1-3, a graphene film was prepared again with the method same to the example 1-2.

After growing the first nano graphene, the grown graphene film was detached from the substrate. The detachment process was performed by a manner of peeling off the graphene-polymer layer after spin coating of the polymer film and the graphene film was detached easily from the substrate in form of graphene-polymer layer.

Wherein PVP(poly vinyl phenol) and PI(polyimid) were used as polymer respectively and the polymer layer was formed as 130 nm and 1.4 µm of thickness respectively.

By reusing the $Al_2O_3$ film on the substrate detached from the graphene film, the process to grow and detach the nano graphene through same process to the sample 1-2 was repeated 3 times.

2. Characterization of Graphene Film Prepared by Reusing of the $Al_2O_3$ Film

Figure 11:
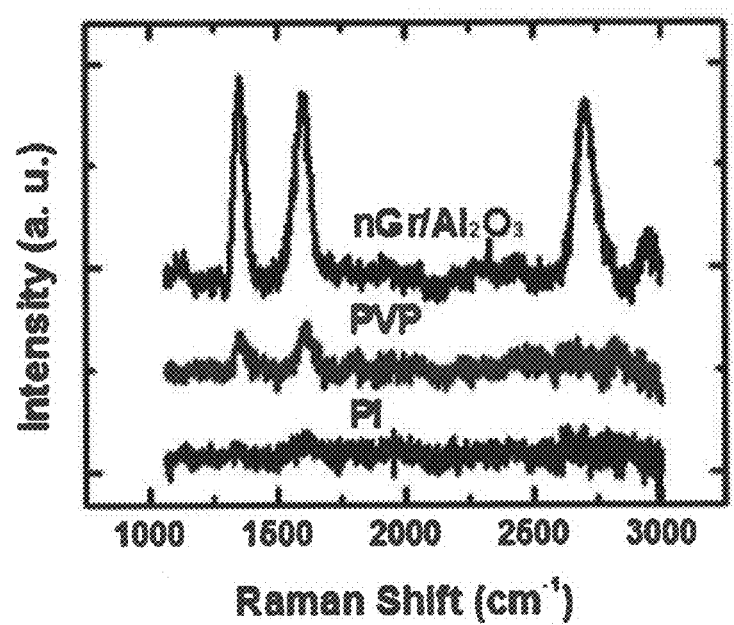
FIG. 11 is a graph showing Raman spectrum (indicated as nGr/Al$_2$O$_3$) of the graphene film formed by growing nano graphene on Al$_2$O$_3$ film on the supporting substrate in the example of the present invention and Raman spectrum of Al$_2$O$_3$ film after separating the graphene film by using PVP or PI (indicated as PVP and PI respectively).

Raman spectrum (indicated as $nGr/Al_2O_3$) of the graphene film formed by growing nano graphene on $Al_2O_3$ film on the supporting substrate and Raman spectrum of $Al_2O_3$ film after detaching the graphene film by using PVP or PI (indicated as PVP and PI respectively) were shown in the FIG. 11. As shown in the FIG. 11, it was identified that as in case of detaching the graphene film by using the PVP film, weak D and G peak were observed, but no 2D peak was observed and in case of detaching the film by using the PI film, none of D, G, and 2D peak was observed, the graphene film was detached completely from the substrate through the detachment process using the 2 types of polymer.

Figure 12:
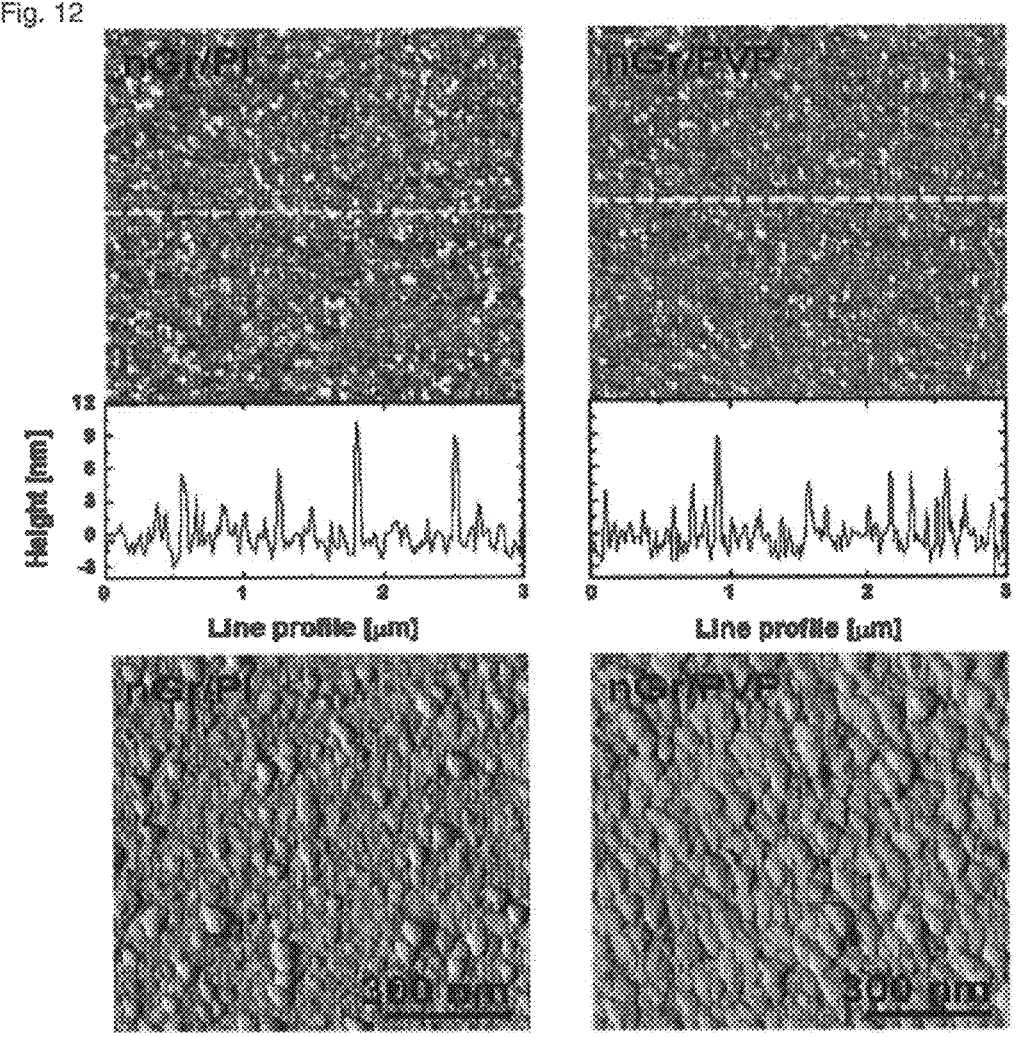
FIG. 12 shows AFM images (top) and a LFM images (bottom) of graphene-polymer film detached by using PI and PVP respectively.

Besides, FIG. 12 shows AFM images (top) and LFM images (bottom) of graphene-polymer film detached by using PI and PVP respectively. As shown in the FIG. 12, it was identified that the graphene layer composed of nano grains was detached cleanly from the substrate; the surface roughness was 2.2 nm for detachment with PI and 1.6 nm for PVP.

Figure 13:
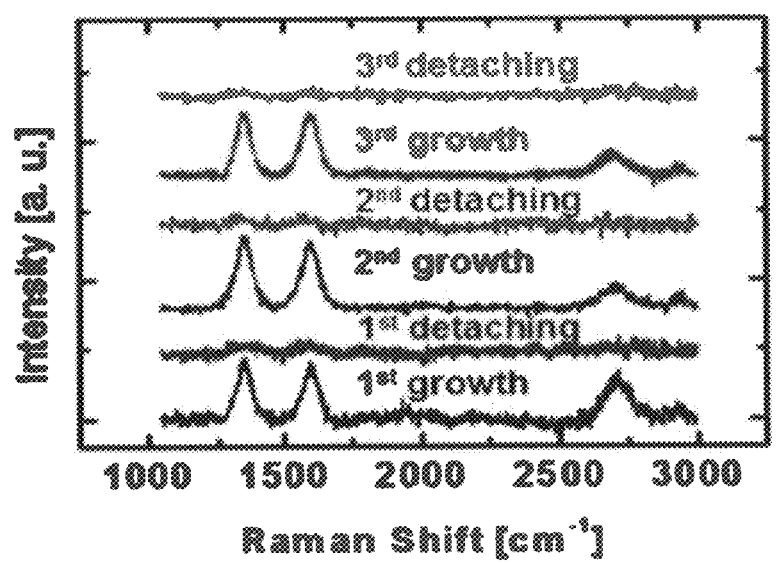
FIG. 13 shows Raman spectrum measurement results of substrate or graphene film, in case of repeating growth and detachment of the graphene film using a Al$_2$O$_3$ film form substrate in the example of the present invention.

Additionally, Raman spectrum measurement result of the substrate or the graphene film in each process to grow, detach, and grow graphene film by reuse of the substrate were shown in FIG. 13. Referencing the FIG. 13, it was identified that in spite of repeated growth and detachment of the graphene film, it was prepared and detached successfully, which was a result showing that the $Al_2O_3$ film formed insulating substrate of the present invention could growth graphene film multiple times by reuse of same substrate.

Comparative Example 1 and 2

Preparation of Graphene Film on $SiO_2$ and Cu

1. Preparation of Graphene Film in the Comparative Example 1 and 2

Samples were prepared with the same method to the example 1, other than using $SiO_2$ and Cu substrate instead of the $Al_2O_3$ grown substrate and used as comparative example 1 and 2. 15 min of growth time was applied identically in the comparative example 1 and 2 and hydrogen gas instead of Ar gas was used as ambient gas for preparing the comparative example 2 using copper.

2. Characterization of Graphene Film in the Comparative Example 1 and 2

Figure 14:
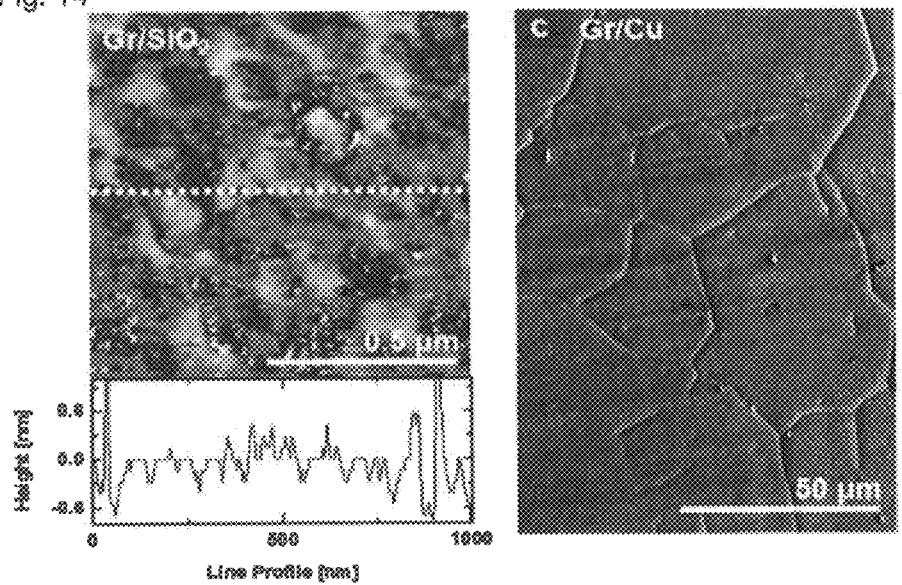
FIG. 14 shows an AFM image (left, grown on SiO2 substrate) and a SEM image (right, grown on Cu substrate) of graphene of comparative example 1 and 2.

An AFM image of graphene film of the comparative example 1 grown on the $SiO_2$ substrate was shown in left of FIG. 14 and a SEM image of graphene film of the comparative example 2 grown on Cu substrate was shown in right, FIG. 14. As shown in the FIG. 14, it was identified that the graphene film grown on the Cu had grains of which size reached several tens on and the graphene film grown on the $SiO_2$ substrate also had significantly large grain with a shape like film.

3. Raman Spectrum Assessment of Graphene Film in the Example 1, the Comparative Example 1 and 2

Figure 15:
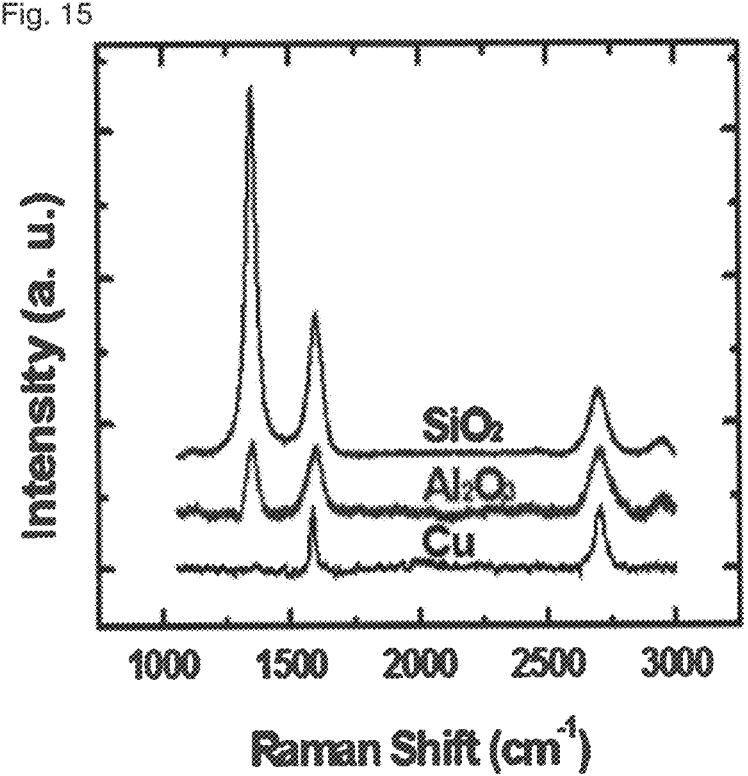
FIG. 15 is a Raman spectrum result measured by using graphene films of the sample 1 (Al2O3), the comparative example 1 (SiO2) and the comparative example 2 (Cu).

Raman spectrum results measured by using graphene films of the sample 1 ($Al_2O_3$), the comparative example 1 ($SiO_2$) and the comparative example 2 (Cu) were shown in FIG. 15. In addition, the results of Raman spectrum shown in the FIG. 15 were summarized in below table 1.

TABLE 1

| substrate | D-peak (cm−1) position | D-peak (cm−1) FWHM | G-peak (cm−1) position | G-peak (cm−1) FWHM | 2D-peak (cm−1) position | 2D-peak (cm−1) FWHM | Ratio IG/ID | Ratio IG/I2D |
|---|---|---|---|---|---|---|---|---|
| Cu | NONE | NONE | 1584 | 21 | 2703 | 30.1 | NONE | 0.97 |
| SiO2 | 1348.6 | 41.4 | 1598 | 55.4 | 2703 | 69.4 | 0.38 | 2.26 |
| Al2O3 | 1352.4 | 42.5 | 1600 | 59.7 | 2707 | 80.7 | 0.85 | 1.06 |

* For all the graphene films in the Table 1, 15 min of growth time was applied.

As shown in the results of Table 1 and FIG. 15, it was identified that possibility to grow high quality graphene film depended on which substrate was used for the growth of graphene film.

In the above results, it was found that G peak of the sp2 carbon-carbon bond that had appeared around 1582 $cm^{-1}$ was shifted and it was considered that this was developed by transformation of hexagonal symmetry caused by strain from interaction with the substrate or other graphene layer.

Figure 16:
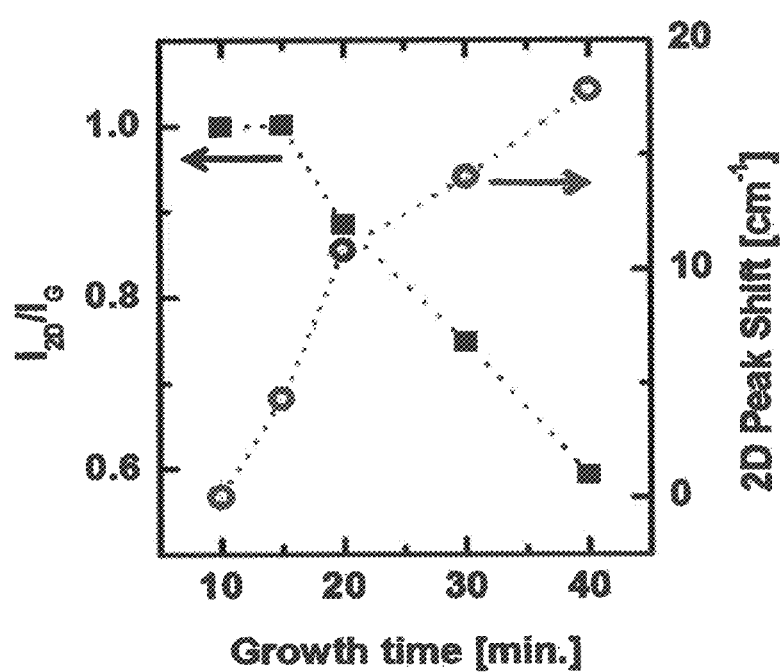
FIG. 16 is a graph showing translocation of 2D peak measured by Raman spectrum and variation of I2D/IG ratio, according to growth time of samples of the example.

FIG. 16 is a graph showing translocation of 2D peak measured by Raman spectrum and variation of I2D/IG ratio, according to different growth time of samples of the example. As shown in the results of FIG. 16, FIG. 15 and Table 1, it was found that translocation of 2D peak of $Al_2O_3$ (sample 1 of the example 1) increased according to variation of growth time, which was considered because mechanical strain of the graphene film increased with increase of the growth time.

Example 4

Preparation of TFT Using Graphene Film

1. Channel Formation Using the Prepared Graphene Film

Using the graphene film prepared by the example 1, undercut structure formation and annealing were performed with lift-off resist (LOR, LOR 2A, Microchemicals) and spin coating of photo resist (PR, AZ5214E, Microchemicals) was performed.

After irradiating 356 nm of light on a photo mask, etching and photo resist patterning with a developer (AZ 300 MIF developer, Microchemicals) were performed. Then, undercut was formed under the photo resist pattern by using the developer.

After that, source and drain electrode (Ti 1 nm/Au 30 nm) were formed through lift off. An gate electrode was formed similarly.

Through additional photolithography and O2-RIE (O2 20 sccm at 20 mtorr, 100 W for 30 sec), outline of the channel area was made clear.

2. Growth of Gate Dielectric Film

Gate dielectric substance was prepared according to below method. By spin coating of poly(amic acid) solution (Aldrish) and annealing for removing residual solvent after growing $Al_2O_3$ film with ALD, poly imide (PI) film was prepared. In order to form the PI film after soft baking, the film was heated under Ar atmosphere at 250° C. for 2 hr.

Or PVP film was prepared by spin coating of PVP solution. 1 g of PVP powder and 0.2 g of cross linker (poly-(melamine-co-formaldehyde), methylated) were mixed and dissolved the mixture in 10.8 g of propylene glycol monomethyl ether acetate to prepare the PVP solution. The spin coated film was annealed at 100° C. for 1 min and at 200° C. for 5 min.

3. Characterization of nGr TFTs

Figure 17:
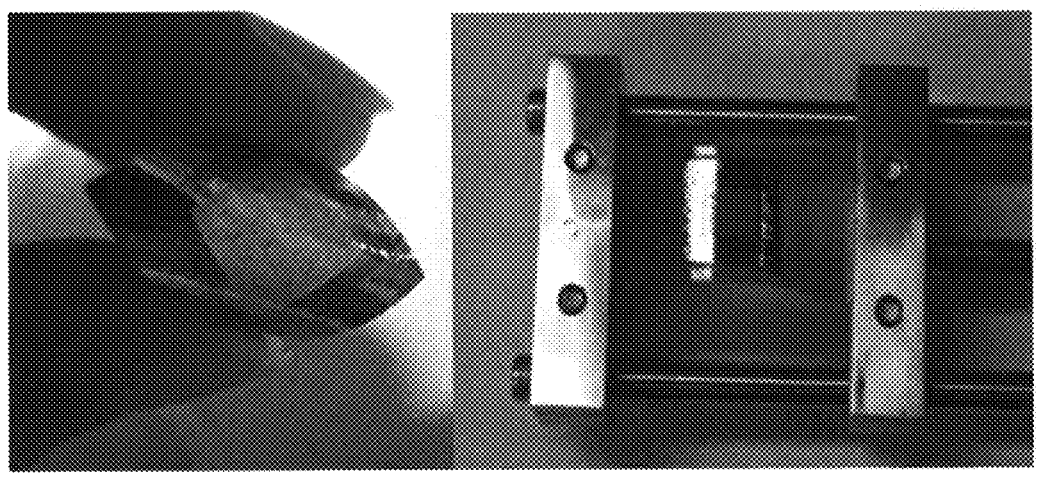
FIG. 17 is a bending test image of sample formed on polyimide film (PI/thermal release tape) with 200 μm of TFT thickness manufactured with graphene film according to an example of the present invention.
Figure 18:
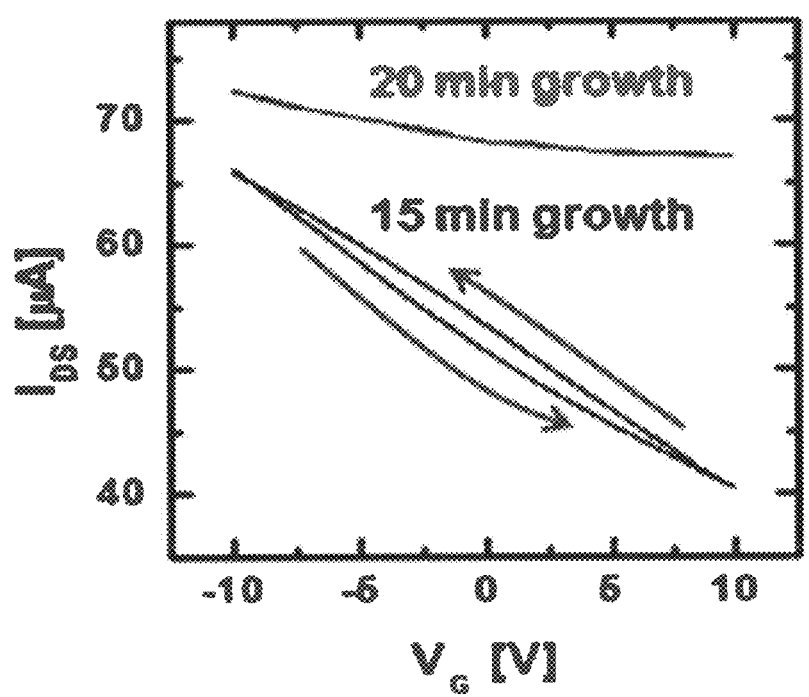
FIG. 18 is a drain current-gate voltage transfer curve of top gate TFT manufactured using the graphene film manufactured with 15-20 min of growth time according to an example of the present invention.

FIG. 17 is a photo of TFTs sample prepared with graphene film formed on poly imide film (PI/thermal release tape) with 200 μm of thickness. As shown in the photos, it was identified that TFT with flexible property was formed well. FIG. 18 is a drain current-gate voltage transfer curve of top gate TFT manufactured using the graphene film manufactured with 15-20 min of growth time.

4. Comparative Assessment of nGr Sheet Resistance and Character Transformation Evaluation in Device Manufacturing Process FIG. 19 shows a graph comparing sheet resistance (Rs) of the graphene film manufactured by the example of the present invention with graphene films grown on various substrate (right) and results of sheet resistance measurement of graphene film in the process of top gate FET formation process.

Figure 19:
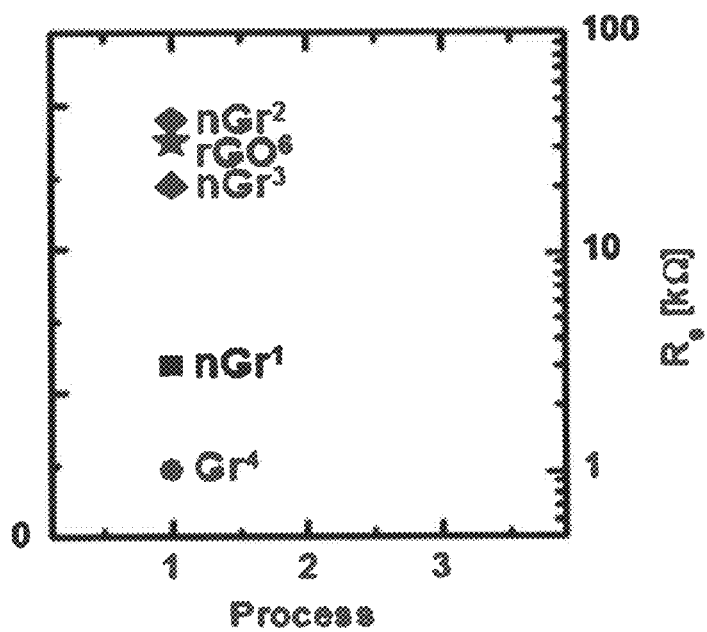
FIG. 19 shows a graph comparing sheet resistance (Rs) of the graphene film manufactured by the example of the present invention with various graphene film (right) and results of sheet resistance measurement of graphene film in the process of top gate FET formation process.

In the FIG. 19, nGr1 indicates the sample 1 of the example 1 of the present invention; nGr2 indicates nano graphene with 1 nm of thickness, prepared on the $SiO_2$ substrate by rPECVD (remote plasma-enhanced chemical vapor deposition); nGr3 indicates a double layered nano graphene film prepared on the SiO$_2$ substrate by rPECVD; Gr4 indicates a double layered nano graphene film prepared on the Cu substrate; and rGO6 indicates a double layered nano graphene reduced after hydrazine treatment and thermal annealing. As results of measuring sheet resistance of graphene film grown on different substrates, it was identified that the sheet resistance of nGr1 corresponding to the example of the present invention was the lowest, 3 kΩ/□ excluding that the sheet resistance of double layered graphene film prepared on Cu substrate was 1 kΩ/□, which was lower than other graphene grown on other substrate including silica (orderly from the lowest, 20 kΩ/□, 31.7 kΩ/□, and 40 kΩ/□).

As results of measuring sheet resistance change of graphene film in the top gate FET formation process, it was identified that with progression of the process, the sheet resistance of the film was increased from 3 kΩ/□ to 6.3 kΩ/□.

5. Bending Test of TFT Prepared with Graphene Film

Figure 20:
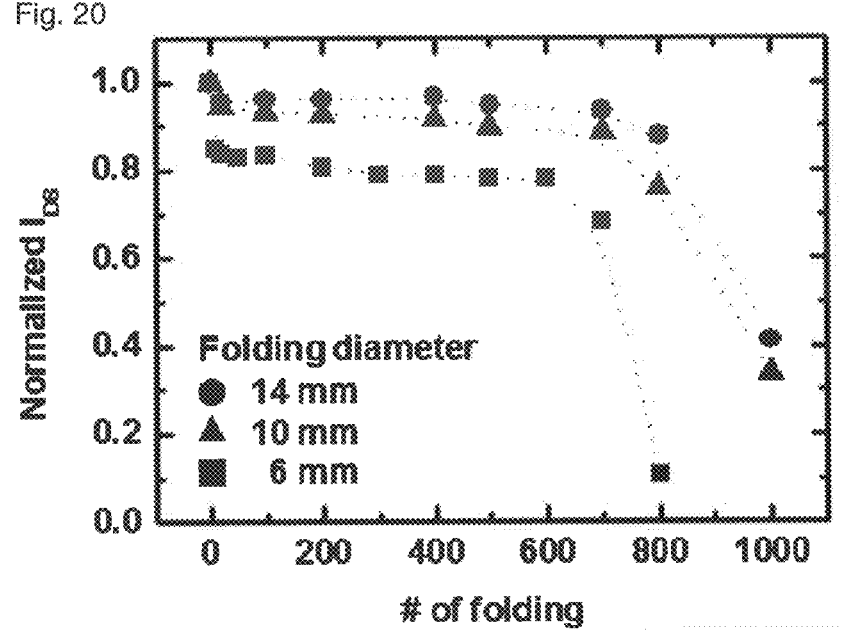
FIG. 20 is a graph showing variation of IDS according to the number of repeated folding, changing the bending diameter to 14 mm, 10 mm, and 6 mm with TFT manufactured by an example of the present invention.
Figure 21:
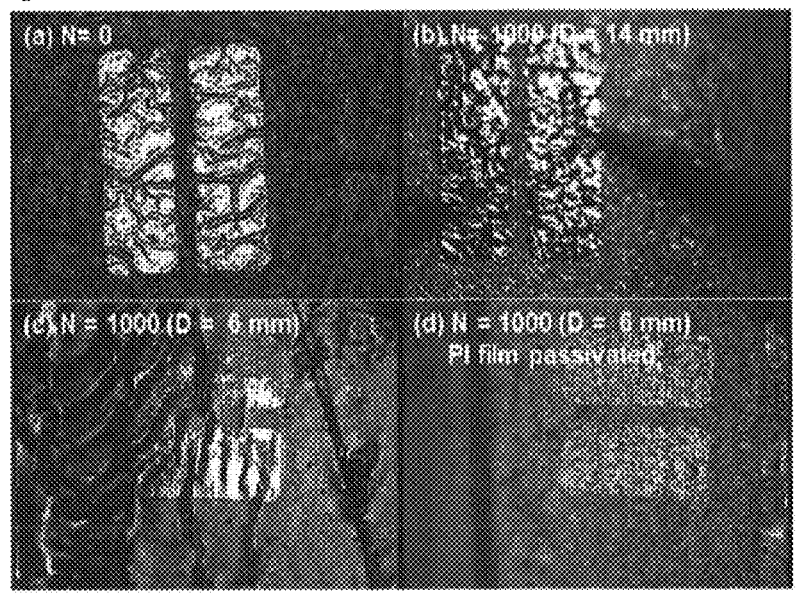
FIG. 21 shows optical microscope images of electrode including graphene film after repetitive bending test, wherein D means bending diameter and N means the number of bending repetition.

FIG. 20 is a graph showing variation of IDS according to the number of repeated folding, changing the bending diameter to 14 mm, 10 mm, and 6 mm with TFT manufactured by an example of the present invention and FIG. 21 shows optical microscope images of electrode including graphene film after repetitive bending test, wherein D means the bending diameter and N means the number of bending repetition.

As shown in FIG. 20 and FIG. 21, it was identified that TFT using graphene channel prepared by the example of the present invention showed insignificant IDS change, in spite of about 600-700 times of repeated folding with 14 mm, 10 mm, and 6 mm of bending diameter.

Concretely, in case of testing 14 and 10 mm of the bending diameter respectively, current reduction was no more than about 5% until initial 20 times of bending test and in case of testing 6 mm of bending diameter, the current reduction was 16%. It was identified that after this current reduction, the current reduction according to folding number was insignificant until about 500 time and it was remarkably stable.

However it was found that after about 1000 number of folding, large current reduction was shown and as shown in the FIG. 21, it was identified that damage of the electrode was confirmed even on the optical microscopic images. Especially, it was identified that in the example of 1000 times of the folding repetition with 6 mm of bending diameter corresponding to (c), the graphene electrode was damaged significantly. However, there was no significant damage on the sample protected with polymer film and from this results, it was identified that the graphene film including the graphene layer of the present invention could obtain excellent effects even in applying it to flexible electronic devices.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for manufacturing graphene film, comprising:
   (1) introducing a supporting substrate in a reactor;
   (2) preparing a nano crystalline layer of the alumina catalyst having catalytic activity on the supporting substrate; and
   (3) growing nano-graphenes on the nano crystalline layer of the alumina catalyst to manufacture a graphene film comprising a graphene layer of the nano-graphenes,
   wherein the growing of the nano-graphenes is accomplished by pyrolyzing carbon source included in a reactive gas to grow the nano-graphenes on the supporting substrate,
   wherein the method is essentially free of the use of a metal catalyst in the step (3), and
   wherein the nano crystalline layer of the alumina catalyst comprises at least one selected from the group consisting of gamma alumina, delta alumina, and the combination thereof.

2. The method for manufacturing graphene film according to claim 1, wherein a grain size of the nano graphene is controlled to 5 nm-1000 μm by controlling growth time of the nano graphene in the step (3).

3. The method for manufacturing graphene film according to claim 1, wherein in the step (3), the nano graphenes are grown with growth time of no more than 120 mins.

4. The method for manufacturing graphene film according to claim 1, wherein in the step (3), a growth temperature of the graphene film is no more than 1350° C.

5. The method for manufacturing graphene film according to claim 1, wherein the carbo source in the step (3) is at least one selected from the group consisting of methane, ethane, propane, acetylene, methanol, ethanol, propanol and the combinations thereof.

6. The method of manufacturing graphene film according to claim 1, wherein the reactive gas in the step (3) comprises ambient gas which is at least one selected from the group consisting of nitrogen, helium, neon, argon, hydrogen, and the combinations thereof.

7. The method for manufacturing graphene film according to claim 1, wherein the reactive gas comprises H$_2$O and the content of H$_2$O is no more than 20 ppm on the basis of total reactive gas.

8. The method for manufacturing graphene film according to claim 1, wherein the graphene layer comprises single-layer or multi-layer graphene; and an adhesion energy between the layer of the alumina catalyst and the graphene layer has smaller value than that between graphene layers in the multi-layer graphene.

9. The method for manufacturing graphene film according to claim 1, wherein the adhesion energy between the layer of the alumina catalyst and the graphene layer is no more than 5 meV/carbon atom.

10. The method for manufacturing graphene film according to claim 1, wherein the Raman spectrum of the graphene layer has 2D peak shifted to red and FWHM of the 2D peak is 30-100 cm-1.

11. The method for manufacturing graphene film according to claim 1, wherein a precursor for growth of the alumina catalyst comprises at least one aluminum precursor selected from the group consisting of trimethyl aluminium (($CH_3$)$_3$Al, TMA), aluminum isoproxide ([Al(OC$_3$H7)$_3$], IPA), methylpyrolidine-tri-methyl aluminum (MPTMA), ethyl-pyridine-triethyl-aluminum (EPPTEA), ethyl-pyridine-dimethyl-aluminum hydridge (EPPDMAH), alane (AlCH$_3$) and the combinations thereof; and at least one oxygen precursor selected from the croup consisting of $O_3$, $H_2O$ and the combination thereof.

12. The method for manufacturing graphene film according to claim 1, wherein the step (2) comprises crystallizing amorphous or noncrystalline alumina and such crystallization is accomplished by a heat treatment at temperature range of 700° C.-1100° C. for 1-30 mins.

13. The method for manufacturing graphene film according to claim 1, further comprising:
(4) detaching the graphene film from the nano crystalline layer of the alumina catalyst after the step (3).

14. The method for manufacturing graphene film according to claim 13, wherein the step (4) comprises forming a graphene-polymer complex by spreading a polymer solution on the graphene layer and detaching the graphene film which includes the graphene-polymer film from the insulating substrate.

15. The method for manufacturing graphene film according to claim 13, wherein the step (4) comprises manufacturing a graphene-polymer complex by bonding a cohesive polymer film and the graphene layer and detaching the graphene film which includes the graphene-polymer film from the nano crystalline layer of the alumina catalyst.

16. The method for manufacturing graphene film according to claim 13, wherein the nano crystalline layer of the alumina catalyst in the step (4) detached from the graphene film is reused as the nano crystalline layer of the alumina catalyst of the step (1).

17. The method for manufacturing graphene film according to claim 13, wherein the graphene layer has a sheet resistance of no more than 3 k$\Omega$/□.

18. A graphene film comprising a graphene layer of nano-graphenes prepared in a method essentially free of the use of a metal catalyst having a grain size 5 nm-1000 μm wherein a sheet resistance of the graphene layer is no more than 3 k$\Omega$/□; and the Raman spectrum of the graphene layer has 2D peak shifted to red and FWHM of the 2D peak is 30-100 cm$^{-1}$.

19. The graphene film according to claim 18, wherein the graphene layer comprises nano graphenes having a ratio of a mean area to a variance of 0.7-0.9.

* * * * *